United States Patent [19]

Snelling et al.

[11] Patent Number: 5,017,643

[45] Date of Patent: May 21, 1991

[54] COMPOSITION AND PROCESS FOR MAKING POLY (ARYLENE SULFIDE) RESINS REINFORCED WITH GLASS FIBERS

[75] Inventors: Ricky E. Snelling, Tulsa; Joseph E. Figard; Robert W. Morton, both of Bartlesville, all of Okla.

[73] Assignee: Phillips Petroleum Company, Bartlesville, Okla.

[21] Appl. No.: 500,838

[22] Filed: Mar. 20, 1990

[51] Int. Cl.$^5$ .............................................. C08K 3/40
[52] U.S. Cl. ...................................... 524/609; 524/262; 264/136; 156/180; 156/181; 156/296; 523/213; 427/358; 427/387; 427/407.3; 427/434.6; 427/434.7
[58] Field of Search ................. 523/213; 524/262, 609; 264/136; 156/180, 181, 296

[56] References Cited

U.S. PATENT DOCUMENTS

| 3,873,489 | 3/1975 | Thum et al. | 528/30 |
|---|---|---|---|
| 4,044,037 | 8/1977 | Mui et al. | 528/30 |
| 4,151,157 | 4/1979 | Williams et al. | 523/213 |
| 4,284,549 | 8/1981 | Salee | 524/262 |
| 4,365,037 | 12/1982 | Adachi et al. | 524/609 |
| 4,495,017 | 1/1985 | Abe et al. | 156/181 |
| 4,504,551 | 3/1985 | Leland | 524/609 |
| 4,528,310 | 7/1985 | Blackwell | 524/609 |
| 4,590,104 | 5/1986 | Zeiner et al. | 427/385.5 |
| 4,680,224 | 7/1987 | O'Connor | 428/294 |
| 4,680,326 | 7/1987 | Leland et al. | 524/609 |
| 4,894,105 | 1/1990 | Dyksterhouse et al. | 156/181 |

FOREIGN PATENT DOCUMENTS

| 125472 | 11/1984 | European Pat. Off. | 264/136 |
| 176103 | 8/1987 | Japan . | |

Primary Examiner—Melvyn I. Marquis
Assistant Examiner—David W. Woodward
Attorney, Agent, or Firm—Archie L. Robbins

[57] ABSTRACT

Continuous glass fiber reinforced composites are made by pultruding the fibers with mixtures of certain silanes and thermoplastic resin in which the silanes have adsorbed onto the thermoplastic resin.

4 Claims, 1 Drawing Sheet

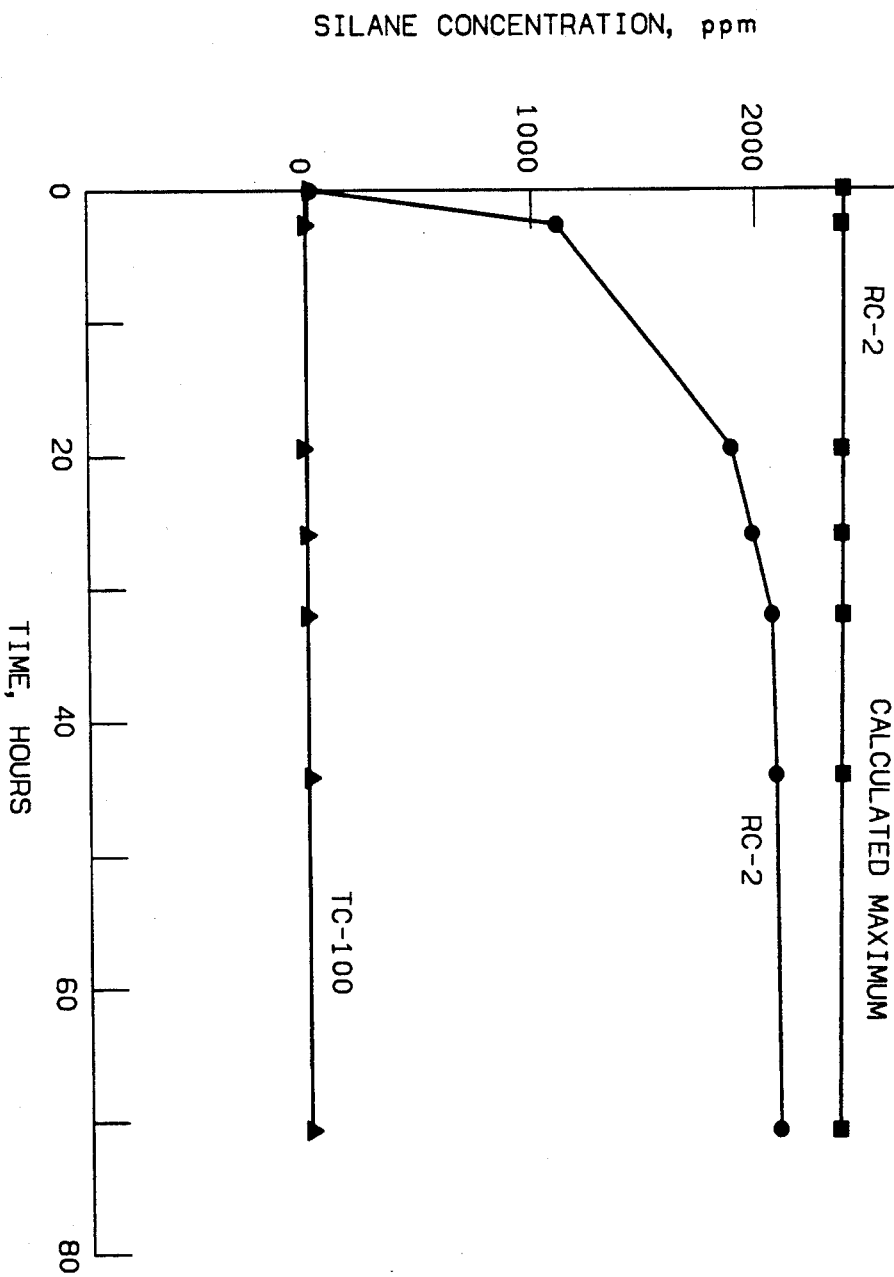

COMPOSITION AND PROCESS FOR MAKING POLY (ARYLENE SULFIDE) RESINS REINFORCED WITH GLASS FIBERS

BACKGROUND OF THE INVENTION

The present invention relates to fiber reinforced thermoplastic materials.

The production of thermoplastic material of poly(arylene sulfide) resins reinforced with unidirectional glass fibers by pultrusion has been disclosed. See, for example, U.S. Pat. No. 4,680,224. At least one fiber strand of continuous filaments is contacted with a poly(arylene sulfide) resin in the form of a powder or a slurry. The impregnated strand or strands are then pulled through a temperature controlled die for producing a composite which can have the form of, for example, a tape, a rod or a sheet.

The glass fiber reinforced pre-preg tapes produced in this manner are useful for such applications as structural members, aircraft parts, doctor blades, and the like.

For some applications the continuous fiber reinforced thermoplastic pre-preg tape will be more useful with improved transverse tensile strength and improved hydrolytic stability. For example, doctor blades used to process aqueous-based materials require materials of construction that have good hydrolytic stability and good transverse tensile. Likewise, structural members subjected to multi-directional high loads require materials of construction with, among other properties, good transverse tensile strength. Good transverse tensile strength also helps to eliminate continuous fiber composite microcracking, mitigates the propagation of microcracking under loaded conditions and improves resistance to fatigue.

Properties such as transverse tensile strength and hydrolytic stability in thermoplastic material of poly(arylene sulfide) reinforced with glass fibers have been improved by use of silanes. When the silanes are mixed with the poly(arylene sulfide) prior to application on the glass fiber it is important that the silanes are maintained at consistent concentrations in the poly(arylene sulfide)s during treatment of the glass fibers and that coating of the glass fibers be uniform.

SUMMARY OF THE INVENTION

It is an object of this invention to provide a method for preparing a thermoplastic resin and silane mixture suitable for use in preparing glass reinforced thermoplastic composites. It is also an object to provide this mixture, which will be useful in making thermoplastic composites with improved properties.

It is an object of this invention to provide a method for producing continuous fiber reinforced thermoplastic material in which the fibers are treated with a silane and thermoplastic mixture.

In accordance with this invention mixtures of polysulfide organosilanes and poly(arylene sulfides) are aged to allow adsorption of the silanes onto the poly(arylene sulfides) and these mixtures are provided.

In accordance with another embodiment of the present invention an aged mixture of at least one polysulfide organosilane and poly(arylene sulfide) is used in a method of making glass reinforced composites.

In accordance with yet another embodiment of the present invention, glass fiber reinforced poly(arylene sulfide) pre-preg tapes are prepared by passing single end glass roving through a slurry containing an aged mixture of the poly(arylene sulfide) matrix material and a polysulfide organosilane.

BRIEF DESCRIPTION OF THE DRAWING

FIG. 1 illustrates silane adsorption on poly(phenylene sulfide) as a function of time.

DETAILED DESCRIPTION

The silane and thermoplastic compositions of this invention are useful for improving the process for making glass reinforced thermoplastic composites. When silanes and thermoplastic resins are mixed in a slurry bath for pultrusion of glass reinforcing fibers the concentration of silane in the slurry must be kept consistent over time and throughout the slurry mix. This has been done by constant monitoring and adjustment of feeds to the slurry bath. To avoid inconsistencies in silane concentration and to eliminate the necessity of frequent monitoring and feed adjustment during the pultrustion process, this invention provides for aging a polysulfide silane and thermoplastic mixture before introduction of the mixture into the slurry bath. This surprisingly gives continued even distribution of the silane throughout the thermoplastic matrix material, thus permitting improved contact of the silane and thermoplastic mixture with the glass reinforcing material.

Examples of poly(arylene sulfide) resins contemplated as useful in making the compositions of this invention include those described in U.S Pat. No. 3,354,129 issued to Edmonds and Hill on Nov. 21, 1967, and those described in U.S. Pat. No. 3,919,177, issued to Campbell on Nov. 11, 1977, the disclosures of which are hereby incorporated by reference. The presently preferred polymer is poly(phenylene sulfide).

The term poly(arylene sulfide) includes homopolymers and the normally solid arylene sulfide copolymers, terpolymers and the like having melting or softening points of at least about 150° C., and more preferably from about 200° C. to about 400° C. Other examples of poly(arylene sulfide) materials are poly(4,4-biphenylene sulfide), poly(2,4-tolylene sulfide), and a copolymer from p-dichlorobenzene, 2,4-dichlorotoluene and sodium sulfide and the like.

The term poly(phenylene sulfide) includes homopolymers and copolymers containing ortho-, meta- and/or para-phenylene linkages on aryl groups in the polymer chain. Also included are aryl-substituted derviatives of these materials. Also included are poly(arylene sulfide sulfone), poly(arylene sulfide ketone) and poly(arylene sulfide diketone).

The organosilanes contemplated as useful in making the compositions of this invention include aromatic polysulfide silanes within the formula:

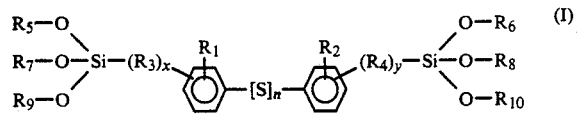

The number of sulfur atoms (S) linking the two aromatic groups is determined by the value of n which represents a positive integer and ranges from 1 to 30. A subgenus within the scope of this invention is represented by formula I wherein n ranges from 1 to 10. The preferred value for n is from 1 to 5.

Each of $R_1$ and $R_2$ is H or an alkyl group having from 1 to 30 carbon atoms. Each of $R_5$, $R_6$, $R_7$, $R_8$, $R_9$, and $R_{10}$ is an alkyl group having from 1 to 30 carbon atoms. The alkyl groups associated with $R_1$, $R_2$, $R_5$, $R_6$, $R_7$, $R_8$, $R_9$ and $R_{10}$ can be linear (e.g. n-propyl) or branched (e.g. tert-butyl). Examples of alkyl groups within the scope of this invention include, but are not limited to, the following:

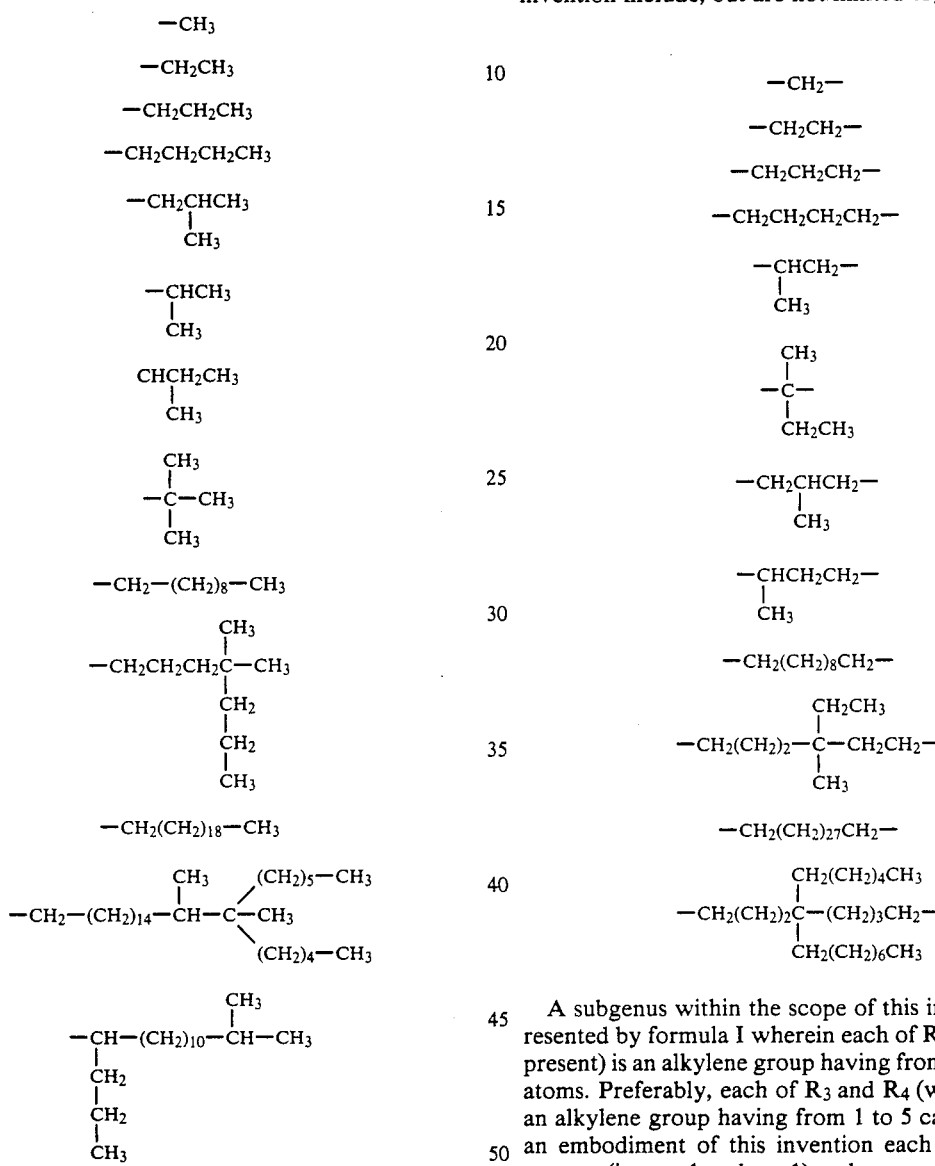

A subgenus within the scope of this invention is represented by formula I wherein each of $R_1$ and $R_2$ is H or an alkyl group having from 1 to 10 carbon atoms and each of $R_5$, $R_6$, $R_7$, $R_8$, $R_9$ and $R_{10}$ is an alkyl group having from 1 to 10 carbon atoms. Preferably, each of $R_1$ and $R_2$ is H or an alkyl group having from 1 to 5 carbon atoms and each of $R_5$, $R_6$, $R_7$, $R_8$, $R_9$ and $R_{10}$ is an alkyl group having from 1 to 5 carbon atoms. In an embodiment of this invention each of $R_1$ and $R_2$ represents a methyl group (—CH$_3$) and each of $R_5$, $R_6$, $R_7$, $R_8$, $R_9$ and $R_{10}$ represents an ethyl group (—CH$_2$CH$_3$).

Each of the letters x and y represents either 1 or 0. When $x=0$, $R_3$ is absent from formula I and the Si bond extends to a carbon member of the corresponding aromatic ring. When $x=1$, $R_3$ is as defined below. In a similar manner when $y=0$, $R_4$ is absent from formula I and the Si bond extends to a carbon member of the corresponding aromatic ring. When $y=1$, $R_4$ is as defined below.

Each of $R_3$ and $R_4$, when present (i.e. when $x=1$, $y=1$), is an alkylene group having from 1 to 30 carbon atoms. The alkylene group can be linear or branched. Examples of alkylene groups within the scope of this invention include, but are not limited to, the following:

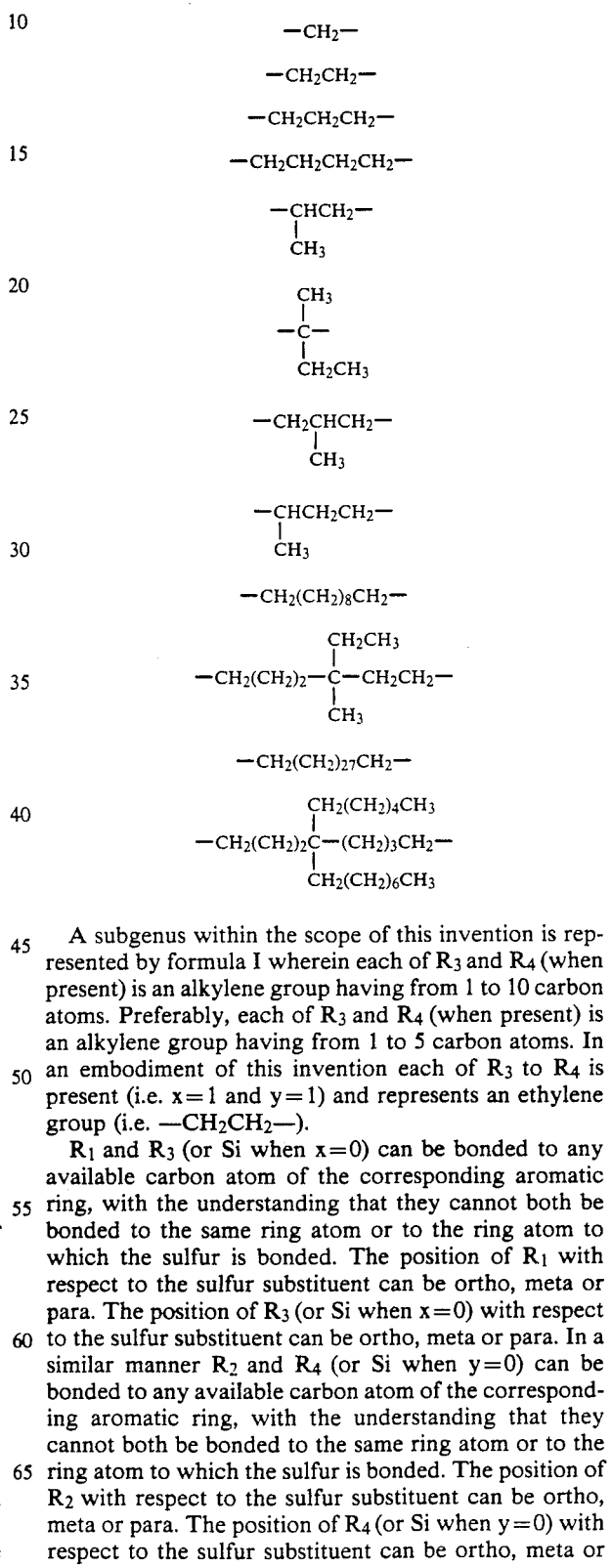

A subgenus within the scope of this invention is represented by formula I wherein each of $R_3$ and $R_4$ (when present) is an alkylene group having from 1 to 10 carbon atoms. Preferably, each of $R_3$ and $R_4$ (when present) is an alkylene group having from 1 to 5 carbon atoms. In an embodiment of this invention each of $R_3$ to $R_4$ is present (i.e. $x=1$ and $y=1$) and represents an ethylene group (i.e. —CH$_2$CH$_2$—).

$R_1$ and $R_3$ (or Si when $x=0$) can be bonded to any available carbon atom of the corresponding aromatic ring, with the understanding that they cannot both be bonded to the same ring atom or to the ring atom to which the sulfur is bonded. The position of $R_1$ with respect to the sulfur substituent can be ortho, meta or para. The position of $R_3$ (or Si when $x=0$) with respect to the sulfur substituent can be ortho, meta or para. In a similar manner $R_2$ and $R_4$ (or Si when $y=0$) can be bonded to any available carbon atom of the corresponding aromatic ring, with the understanding that they cannot both be bonded to the same ring atom or to the ring atom to which the sulfur is bonded. The position of $R_2$ with respect to the sulfur substituent can be ortho, meta or para. The position of $R_4$ (or Si when $y=0$) with respect to the sulfur substituent can be ortho, meta or para. Examples of various orientations within the scope of this invention include, but are not limited to, the following:

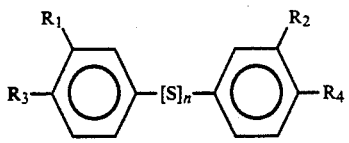 (II)

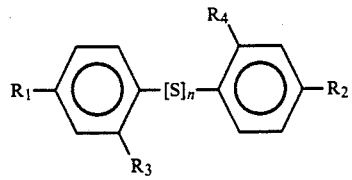 (V)

The preferred silane compounds of this invention are defined by the following chemical formula:

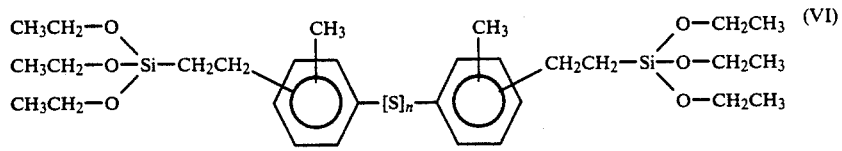 (VI)

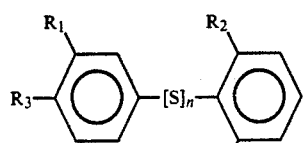 (III)

where n is an integer from 1 to 5. Included are all positional isomers of the above. Examples include, but are not limited to, the following:

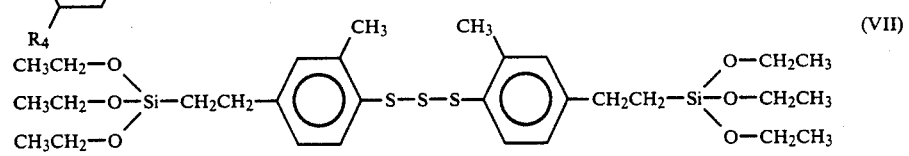 (VII)

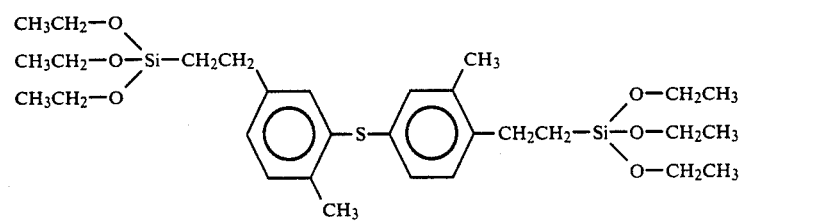 (VIII)

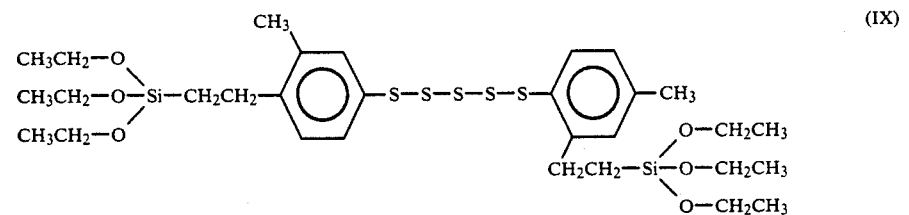 (IX)

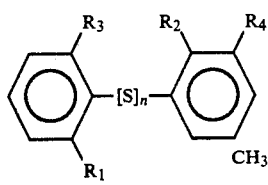 (IV)

The composition can contain more than one silane within the scope of formulas I through IX. By way of non-limiting example the poly(arylene sulfide) composition can contain the compounds VII, VIII and IX above. In one embodiment of this invention the poly(arylene sulfide) composition contains two or more silanes defined by

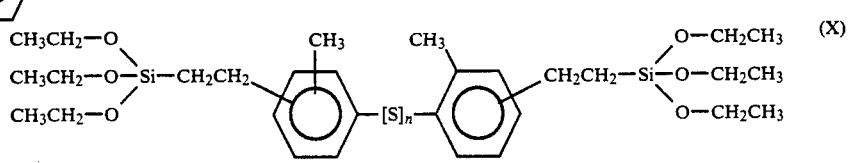 (X)

wherein the average value of n for the mixture is about 2 to about 4 and preferably about 2.8.

Presently preferred is a silane having the formula above wherein $R_1$ and $R_2$ are —CH$_3$; wherein $R_3$ and $R_4$ are —CH$_2$CH$_2$—; wherein $R_5$, $R_6$, $R_7$, $R_8$, $R_9$ and $R_{10}$ are —CH$_2$CH$_3$; wherein x=1 and y=1; wherein the average value of n is about 2.8. This material is commercially available from Union Carbide Corporation under the product name Ucarsil ™ RC-2 or as Y-9194.

The fiber reinforced pultruded thermoplastics produced in accordance with this invention are basically comprised of poly(arylene sulfide) resin, glass reinforcing material, and at least one polysulfide organosilane.

The presently preferred composition of matter comprises substantially linear poly(phenylene sulfide) having a melt flow within the range of about 1 to about 800 grams per 10 minutes, unidirectionally aligned continuous glass fiber reinforcements, a silane content of from about 0.01 to about 5.0 weight percent based on weight of the glass or, more preferably, from about 0.05 to about 0.5 weight percent based on weight of the glass, and demonstrates improved transverse tensile strength.

The weight ratio of the poly(arylene sulfide) to the polysulfide organosilane in the silane and thermoplastic mixture of this invention is greater than about 2 to 1 and less than about 5,000 to 1. The scope of this invention encompasses a broad range and requires only that an amount of silane sufficient to increase the transverse tensile strength or to improve the hydrolytic stability of the resulting composition be used.

The silane and thermoplastic mixtures presently preferred have been aged sufficiently to allow enough adsorption of the polysulfide silane onto the poly(arylene sulfide) to significantly reduce the need for constant monitoring and feed adjusting in a thermoplastic pultrusion process.

The poly(arylene sulfide) resin is present in the pultruded composite in an amount in the range of from about 20% to about 90% by weight of the composition, preferably in the range of from about 25% to about 60% by weight, and most preferably in the range of from about 25% to about 35% by weight.

The glass reinforcing material is present in the pultruded composite in an amount in the range of from about 80% to about 10% by weight of the total composition, preferably from about 40% to about 75% by weight, and most preferably from about 65% to about 75% by weight.

Continuous unidirectionally aligned glass fibers arranged in single end rovings are contemplated as a suitable reinforcement material. The glass fibers are available commercially. Examples include Certainteed 70C sized E glass and Certainteed 70D-11, with the latter being presently preferred. However, fiber contemplated as useful in this invention is not limited to single end roving, but may also be a conventional or assembled roving. Also, these examples are not to be construed as constraints on the diameter of fiber contemplated as useful in this invention.

It is also within the scope of this invention to make a glass reinforced thermoplastic composite by pultruding a woven glass fabric through a slurry of the polysulfide silane and thermoplastic mixture.

Diluents contemplated as useful include but are not limited to water, alcohols and mixtures thereof.

The diluent is typically water or an aqueous mixture containing one or more alcohols. In addition to diluent, the thermoplastic and resin mixture may contain additives such as acid to adjust the pH of the mixture, lubricants, surfactants and wetting agents.

The inventive method for producing the unidirectional fiber reinforced thermoplastic material comprises the following steps:

(1) preparing a slurry or emulsion comprising a thermoplastic resin, one or more of the chosen silanes and optionally other additives as needed;

(2) allowing the thermoplastic resin/silane mixture to age long enough to significantly increase adsorption of the silane onto the thermoplastic resin;

(3) passing the continuous glass fibers through the slurry of step (1);

(4) passing the treated and impregnated glass fibers through an oven;

(5) giving the composite final shaping in a heated die.

Alternatively, after allowing the thermoplastic resin/silane mixture to age (step 2), the mixture could be dried, then used in a second slurry for step (3).

Preferably the oven will maintain the temperature of the poly(arylene sulfide) at least as high as the melting point of the poly(arylene sulfide).

The slurry or emulsion is prepared by any suitable procedure. One method is to mix the silane and surfactant, add the silane/surfactant mixture to the water and then add the poly(arylene sulfide) powder. Agitation of the components during the preparation and aging of the mixture is advantageous. Any suitable temperature, usually 20–50° C., may be used during aging of the mixture and for the bath temperature.

Having a mixture of the thermoplastic resin and silane in which the silane is substantially completely adsorbed onto the thermoplastic prior to use of the mixture as a slurry for pultrusion allows for running the pultrusion process without frequent monitoring of the slurry bath for consistency of the concentration of silane in the slurry.

Adsorption significantly increases during the first approximately 20 hours and exhibits a slower adsorption rate from about 20 hours to about 35 hours of aging. Thereafter the increase in adsorption is significantly slowed. After about 48 hours of aging, there does not appear to be any appreciable increase in the amount of silane adsorbed onto the thermoplastic resin. Presently preferred is from about 1 hour to about 100 hours of aging. More preferred is from about 6 hours to about 75 hours; most preferred is from about 12 hours to about 48 hours.

The rate of adsorption of the silane onto the poly(arylene sulfide) depends upon such factors as bath temperature, silane concentration, poly(arylene sulfide) surface area, and agitation.

Commerical objectives in production of fiber reinforced thermoplastic materials may not require maximum adsorption of the polysulfide silane onto the poly(arylene sulfide) because of the benefits obtainable with use of shorter aging periods.

EXAMPLE I

This example demonstrates the difference in behavior oi the polysulfide silanes which are used in this invention and an epoxy silane in an aqueous bath with polyphenylene sulfide (PPS). An air milled PPS with a mean particle size of 17 microns was combined with aqueous solutions of the silanes (0.5 weight percent silane based on the PPS weight). The mixtures, about 3000 g, containing 15 weight percent PPS were stirred with magnetic stirring bars at 28° C. At various time intervals a 100 mL sample of each slurry was collected and analyzed. Each sample slurry was centrifuged and the liquid removed for analysis of the silicon content by inductively coupled plasma. The PPS solid was collected by filtering on a Buchner funnel, washed with water, dried for a minimum of 15 minutes at 110° C., and analyzed for silicon content by neutron activation. Calculations involving Ucarsil ™ RC-2 assume that the molecular weight is 652 g/mole, the alkyl groups on the aromatic rings are methyl, and that there are 2.8 sulfur atoms per molecule.

The results of the control run using Ucarsil ™ TC-100 epoxy silane (3-glycidoxypropyltrimethoxysilane) from Union Carbide are summarized in Table I. The TC-100 remains predominantly in the aqueous solution during the test and very little silicon was detected on the PPS over the time period of the test. FIG. 1 shows the concentration of silicon on the PPS during the test.

In sharp contrast with the above results with TC-100, the run with the Ucarsil ™ RC-2 polysulfide silane from Union Carbide (Table II) shows that the RC-2 silane adheres to the PPS. About 83 weight percent of the RC-2 initially present in the solution was found on the PPS after about 24 hours and about 88 weight percent of the RC-2 was on the PPS after 48 hours. The silicon levels in the liquid phase are believed to be low due to difficulties in asperating the relatively insoluble silane to the plasma torch with the existing equipment. The results of this run are also shown in FIG. 1 with the upper line representing the calculated maximum possible level of silicon on PPS. These curves in FIG. 1 clearly show the difference in behavior between the epoxy silane and the polysulfide silane in an aqueous mixture with PPS.

TABLE I

| | Epoxy Silane Distribution in Aqueous Poly(phenylene sulfide) Bath | |
|---|---|---|
| Time in Bath, hrs. | Silane Concentration in liquid[1], ppm | Silane Concentration on solid[2], ppm |
| 0.0 (calculated) | 570 | 0 |
| 0.0 | 588 | 11 |
| 2.75 | 585 | 14 |
| 19.5 | 585 | 15 |
| 26.0 | 578 | 13 |
| 32.0 | 573 | 12 |
| 44.5 | 579 | 13 |
| 70.75 | 577 | 24 |

[1]Determined by inductively coupled plasma.
[2]Determined by neutron activation.

TABLE II

| | Polysulfide Silane Distribution in Aqueous Poly(phenylene sulfide) Bath | |
|---|---|---|
| Time in Bath, hrs. | Silane Concentration in liquid[1,3], ppm | Silane Concentration on solid[2], ppm |
| 0.0 (calculated) | 430 | 0 |
| 0.0 | 26 | 11 |
| 2.5 | 27 | 1100 |
| 19.25 | 34 | 1900 |
| 25.75 | 31 | 2000 |
| 32.0 | 30 | 2100 |
| 44.25 | 28 | 2100 |
| 70.75 | 24 | 2100 |

[1]Determined by inductively coupled plasma.
[2]Determined by neutron activation.
[3]Low results caused by sample precipitation.

EXAMPLE II

This example demonstrates the preparation and properties of unidirectional continuous glass fiber reinforced poly(phenylene sulfide) (PPS) composites where a polysulfide silane is contacted with the PPS resin and aged before the prepreg operation. Several other silanes were used for composite preparation for comparison.

All compounds were made using techniques disclosed in U.S. Pat. No. 4,680,224, modified to include a curtain sprayer in the slurry bath and rolling redirect bars at any point the glass is wet. All composites were made using Certainteed 70-C sized E glass, 20 micron diameter, 250 yield, 1.0 weight percent of the indicated silane in the slurry bath (based on the weight of resin in the slurry bath), and a poly(phenylene sulfide) with a melt flow of approximately 50-150 g/10 min. (ASTM D1238-79, Procedure B, Condition 315/5.0, modified to use a 5 minute preheat time rather than the 6 minute minimum stated in the test method). Techniques disclosed in U.S. Pat. No. 3,919,177; U.S. Pat. Nos. 4,801,664 and/or 4,414,729 were used for preparation of the poly(phenylene sulfide) for the test.

The slurry concentration and amount of slurry needed for producing the composite will depend on such factors as the size of bath or baths, the line speed and properties of the fiber to be impregnated. This was determined empirically so as to produce a slurry which would result in a composite having 30±2 weight percent resin and 70±2 weight percent glass.

In these examples, the main bath was 20.5 weight percent PPS resin and the add bath was 30 weight percent PPS. The surfactant was Neodol ™ 91-6 at a concentration of 0.26 weight percent based on the PPS weight. Ucarsil ™ RC-2, a polysulfide aromatic silane from Union Carbide, was used in a run with prolonged contact of the PPS with the silane before the pultrusion Several other silanes were used in other runs without extended contact with the PPS. Emulsions were formed when RC-2, T2905, and B2494 were used. DSC-18 was a solid and A-1160 was water soluble.

In the slurry formation, the appropriate amount of water was weighed in a large container and the pH was adjusted to approximately 4 by using acetic acid. The appropriate amount of surfactant was weighed and added to the silane and stirred by hand until the mixture was uniform. Then, the silane/surfactant mixture was added to the water with very rigorous continuous mixing. After all of the silane/surfactant mixture was added to the water, less vigorous stirring was continued for four hours. It is not necessary to stir rigorously after the emulsion has formed.

Then the PPS resin was added to the water/silane/-surfactant mixture. The resulting slurry was very thick and was not used for 48 hours after it had been blended in order to allow the silane to adsorb onto the PPS resin. The mixture was stirred two or three times daily until use.

While this invention has been described in detail for the purpose of illustration, it is not to be construed as limited thereby. This patent is intended to cover all changes and modifications within the spirit and scope thereof.

That which is claimed is:

1. A method of preparing a glass reinforced thermoplastic composite comprising:
   (a) combining poly(arylene sulfide) and at least one silane within the formula:

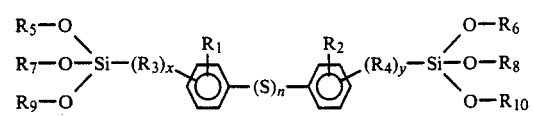

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 to 1; and wherein each of $R_3$ and $R_4$ i an alkylene group having from 1 to 30 carbon atoms;

(b) allowing said mixture to age for a time in the range of about 1 to about 100 hours thereby allowing adsorption of said at least one polysulfide organosilane onto said poly(arylene sulfide);

(c) passing glass fibers through a slurry bath containing said mixture of said poly(arylene sulfide) and said at least one polysulfide organosilane, to impregnate said glass fibers; and (d) heating and shaping said impregnated glass fibers.

2. A method according to claim 1 wherein said mixture is aged form about 6 hours to about 75 hours.

3. A method according to claim 1 wherein said mixture is aged from about 12 hours to about 48 hours.

4. A method according to claim 1 wherein said glass is continuous glass fiber.

* * * * *

UNITED STATES PATENT AND TRADEMARK OFFICE
CERTIFICATE OF CORRECTION

PATENT NO. : 5,017,643

DATED : May 21, 1991

INVENTOR(S) : Ricky E. Snelling, Joseph E. Figard and Robert W. Morton

It is certified that error appears in the above-identified patent and that said Letters Patent is hereby corrected as shown below:

Column 1, line 28, after the word "tensile" add the word ---strength---.

Column 5, please move the "(III)" from line 11 to line 19.

Column 7, line 3, change "Ucarsil TM" to read ---Ucarsil$^{TM}$---.

Column 8, line 56, change "oi" to read ---of---.

Column 9, line 3, change "Ucarsil TM" to read ---Ucarsil$^{TM}$---.

Column 9, line 7, change "Ucarsil TM" to read ---Ucarsil$^{TM}$---.

Column 9, line 15, change "Ucarsil TM" to read ---Ucarsil$^{TM}$---.

Column 10, line 25, change "Neodol TM" to read ---Neodol$^{TM}$---.

Column 10, line 27, change "Ucarsil TM" to read ---Ucarsil$^{TM}$---.

Column 10, line 29, after the word "pultrusion" add a period.

Column 11, line 4, change "i" to read ---is---.

UNITED STATES PATENT AND TRADEMARK OFFICE
CERTIFICATE OF CORRECTION

PATENT NO. : 5,017,643

DATED : May 21, 1991

INVENTOR(S) : Ricky E. Snelling, et al

It is certified that error appears in the above-identified patent and that said Letters Patent is hereby corrected as shown below:

Column 12, line 5, change "form" to read --from--.

Signed and Sealed this

First Day of December, 1992

*Attest:*

DOUGLAS B. COMER

*Attesting Officer*   *Acting Commissioner of Patents and Trademarks*